(12) United States Patent
Fablet et al.

(10) Patent No.: US 9,471,646 B2
(45) Date of Patent: Oct. 18, 2016

(54) METHOD AND SERVER DEVICE FOR EXCHANGING INFORMATION ITEMS WITH A PLURALITY OF CLIENT ENTITIES

(71) Applicant: CANON KABUSHIKI KAISHA, Tokyo (JP)

(72) Inventors: Youenn Fablet, La Dominelais (FR); Romain Bellessort, Rennes (FR); Herve Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 271 days.

(21) Appl. No.: 14/341,695

(22) Filed: Jul. 25, 2014

(65) Prior Publication Data

US 2015/0032804 A1    Jan. 29, 2015

(30) Foreign Application Priority Data

Jul. 26, 2013    (GB) .................................... 1313418.4

(51) Int. Cl.
```
G06F 15/16      (2006.01)
G06F 17/30      (2006.01)
H04L 29/06      (2006.01)
H04L 29/08      (2006.01)
```
(52) U.S. Cl.
CPC ......... *G06F 17/30545* (2013.01); *H04L 67/02* (2013.01); *H04L 67/10* (2013.01); *H04L 67/26* (2013.01); *H04L 69/04* (2013.01); *H04L 69/22* (2013.01)

(58) Field of Classification Search
CPC ........ H04L 67/02; H04L 69/04; H04L 69/22
USPC ................................................. 709/247, 203
See application file for complete search history.

(56) References Cited

U.S. PATENT DOCUMENTS

| | | | |
|---|---|---|---|
| 2011/0145313 A1 | 6/2011 | Narayanan et al. | |
| 2013/0086353 A1* | 4/2013 | Colgrove | G06F 3/0608 711/206 |
| 2013/0185536 A1* | 7/2013 | Mari | G06F 12/08 711/216 |

(Continued)

FOREIGN PATENT DOCUMENTS

EP    0933876 A1    8/1999

OTHER PUBLICATIONS

Peon et al., HTTP Header Compression, draft-ietf-httpbis-header-compression-00, Jun. 25, 2013, all pages.*

(Continued)

*Primary Examiner* — Hieu Hoang
(74) *Attorney, Agent, or Firm* — Canon USA, Inc. I.P. Division

(57) ABSTRACT

The invention concerns a method of exchanging information items, e.g. HTTP headers, between a server device and a plurality of clients, and also concerns such a server device. The server device establishes connections with clients, wherein each connection involves a server-initiated indexing table for the server device to encode information items to be sent over the connection in the server-to-client direction. The method comprises the following steps performed at the server device: obtaining a same single indexing table as the server-initiated indexing table of the connections; in response to receiving a request for data from a client, pushing entries of the table to the client to configure the latter for item exchange in the server-to-client direction, encoding information items associated with the requested data using item indexing based on the table and sending the encoded information items to the client over the connection established with it.

20 Claims, 12 Drawing Sheets

(56) References Cited

U.S. PATENT DOCUMENTS

2014/0149605 A1* 5/2014 Annamalaisami ...... H04L 41/00
709/247
2014/0355627 A1* 12/2014 Bellessort ............... H04L 69/04
370/477

OTHER PUBLICATIONS

Belshe et al., Hypertext Transfer Protocol version 2.0, draft-ietf-httpbis-http2-04, Jul. 8, 2013, all pages.*

* cited by examiner

100 — Set 0

| Set 0 | |
|---|---|
| url | http://example.com/123 |
| method | GET |
| cookie | abcdefgh |

110 — Set 1

| Set 1 | |
|---|---|
| url | http://example.com/456 |
| method | GET |
| cookie | abcdefgh |

120

| Header Table after Set 0 encoding | | |
|---|---|---|
| Index | Header Name | Header Value |
| 0 | url | http://example.com/123 |
| 1 | method | GET |
| 2 | cookie | abcdefgh |

130

| Set 1 Encoding (Set 0 used as reference list) | | Meaning |
|---|---|---|
| IH(0), indexed header 0 in header table | | To be removed from reference list (since present in said list) |
| url | http://example.com/456 | To be added to reference list (since not present in said list) |

Request A (GET index.html)

| Accept | text/html;q=0.9,*/*;q=0.8 |
|---|---|
| Accept-Encoding | gzip, deflate |

Response A (200 OK)

| Status | 200 |
|---|---|
| Content-Type | text/html; charset=UTF-8 |
| Content-Length | 800 |

+ content

(2b)

Request B (GET style.css)

| Accept | text/css,*/*;q=0.1 |
|---|---|
| Accept-Encoding | gzip, deflate |

Response B (200 OK)

| Status | 200 |
|---|---|
| Content-Type | text/css; charset=UTF-8 |
| Content-Length | 400 |

+ content

(2c)

Header Table

| 0 | status | 200 |
|---|---|---|
| 1 | content-type | text/html; charset=UTF-8 |
| 2 | content-type | text/css; charset=UTF-8 |

(2d)

Header Table

| 0 | status | 200 |
|---|---|---|
| 1 | content-type | text/css; charset=UTF-8 |
| 2 | content-type | text/html; charset=UTF-8 |

Fig. 2

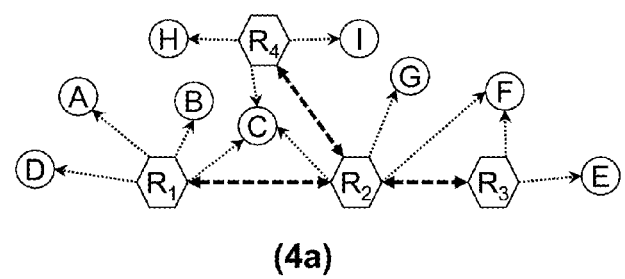
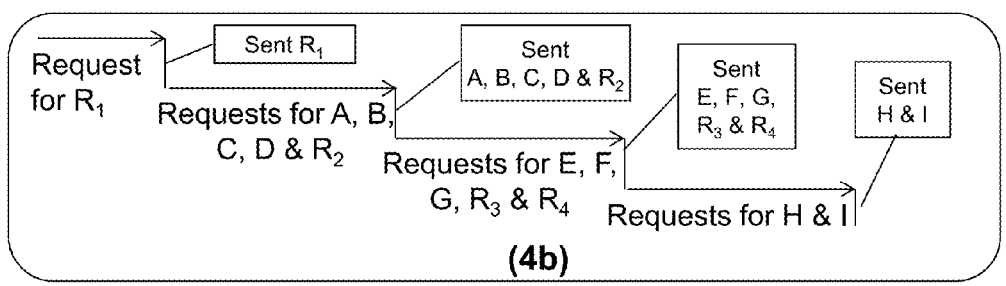
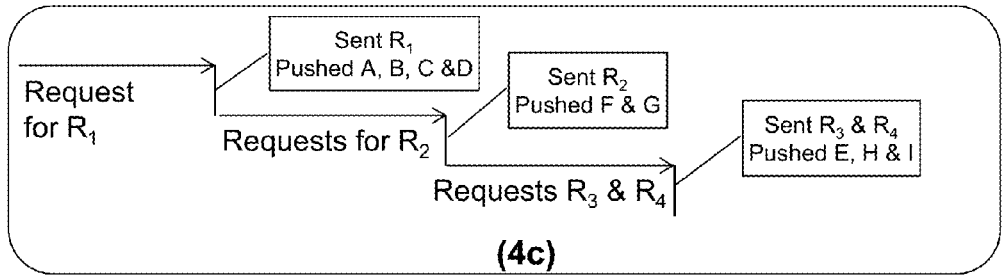
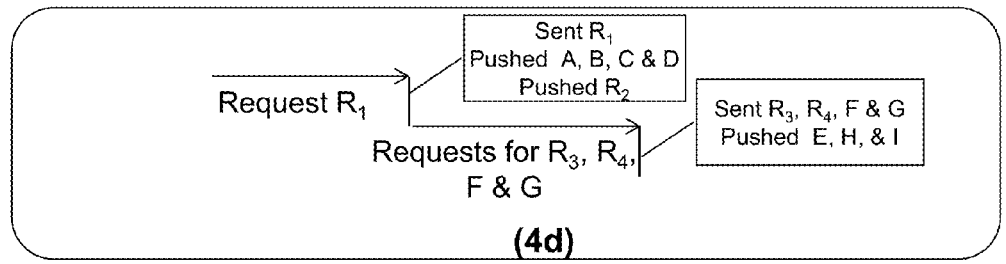
Fig. 4

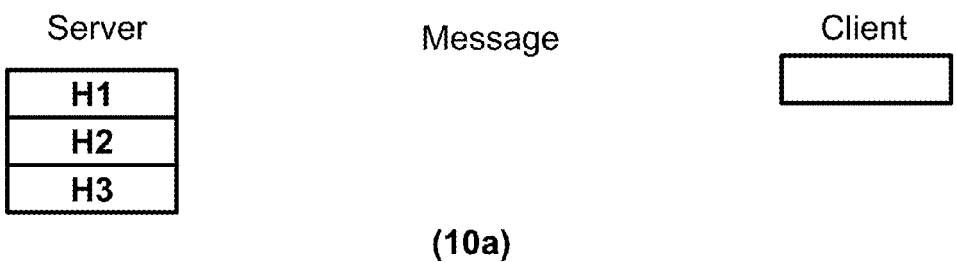
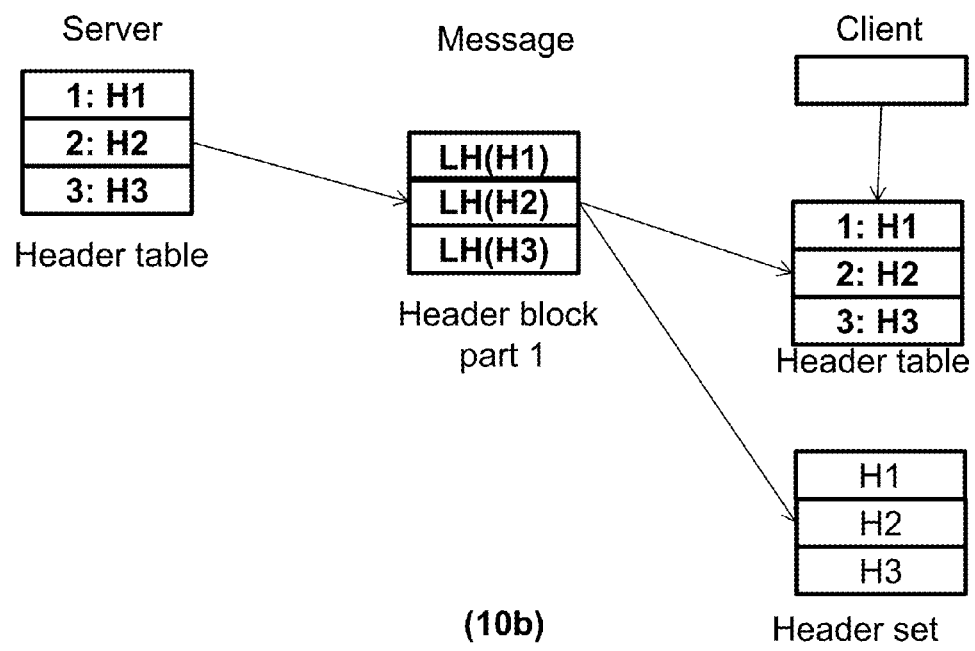
Fig. 10

(10c)

(10d)

(10e)

METHOD AND SERVER DEVICE FOR EXCHANGING INFORMATION ITEMS WITH A PLURALITY OF CLIENT ENTITIES

This application claims priority from GB patent application No. 1313418.4 of Jul. 26, 2013 which is incorporated herein by reference.

FIELD OF THE INVENTION

The invention belongs to the field of network communication, and in particular to the field of data encoding (or compression) using item indexing based on an indexing table.

More particularly, the present invention concerns a method of exchanging information items between a server device and a plurality of client entities, and also concerns such a server device.

BACKGROUND OF THE INVENTION

Data to be encoded often include or are associated with lists or groups of items of information that are also to be compressed at an encoder and decompressed at a decoder. This is for example the case for HTTP (standing for Hypertext Transfer Protocol) where HTTP headers are added to requested data to provide additional information, for example in relation with the connection or protocol used or in relation with the requested data that are sent.

Another example is document or media metadata represented as JSON (standing for JavaScript Object Notation) key-value sets or XML data (standing for Extensible Markup Language).

HTTP is commonly used to request and send data such as web resources, web pages being particular web resources. HTTP is based on a client/server architecture, wherein a client entity initiates a connection with a server device, then sends requests for data, namely HTTP requests, to the server device. Thereafter, the server device replies to the client entity's requests with responses, namely HTTP responses that include the requested data and the so-called HTTP headers.

While in the initial deployment of HTTP, a TCP/IP bidirectional connection was established for each HTTP request/response exchange, SPDY protocol enables several HTTP requests and responses to be sent over a unique TCP/IP bidirectional connection between the client entity and the server device. Based on such persistent bidirectional connection, all the components of a web page (HTML documents, images, JavaScript, etc.) may share the same TCP/IP connection, thus speeding up the web page loading.

The server device usually handles requests for data from a plurality of client entities and provides responses thereto. Some client entities may be embodied within the same device, for example as various client applications requesting the server device. Some other client entities may correspond to the same number of separate client devices.

The explanation and description below concentrate on HTTP headers in HTTP messages, whereas the invention may apply to any list or group of items of information that is encoded or compressed using indexing mechanism.

The HTTP requests and HTTP responses are messages that comprise various parts of data, including header items and payload data. The HTTP headers of an HTTP message, and more generally the headers of a message, form a set of headers, i.e. items of information of a particular type. They are added into the beginning of the response message, before the payload data, to provide additional information useful for various purposes. For example, they may give protocol-based information vital to convey efficiently the response message over the connection implementing the protocol. They may also provide information about the payload data themselves, for example regarding the nature of the date, an image size, etc., this information being necessary for an addressee client entity or application to correctly handle the data.

An HTTP header generally consists of a name along with a corresponding value.

For instance, in the header "Host: en.wikipedia.org", Host is the header name, and its value is "en.wikipedia.org". This header is used to indicate the host of the requested web resource (for instance, the Wikipedia page describing HTTP, available at http://en.wikipedia.org/wiki/HTTP).

Conventional HTTP provides compression of the HTTP payload data before the HTTP message is transmitted, while the set of HTTP headers is not compressed but literally represented, i.e. it is encoded as text data. Literal representation consists in encoding a header by encoding its name and its value as strings.

However, the headers tend to be redundant in successive messages. This is the case for HTTP.

Textual encoding is not efficient in this situation, resulting in some HTTP improvements to have emerged with a view of defining more compact encodings.

HTTP/2.0 standard has been developed in this context and proposes a mechanism for encoding HTTP headers using item indexing based on an indexing table (or compression dictionary). HTTP/2.0 uses a dynamic compression scheme to optimize the size of the representation of HTTP message headers.

A header indexing table (or header table) is defined that comprises a list of entries with which respective coding indexes are associated, each entry being a (header name, header value) pair.

The header indexing table is filled with some headers, selected by the encoder, that are encoded using literal representation. It is said that the literally encoded header is indexed in the table, i.e. is added to the header indexing table.

Two different kinds of indexing are available: incremental indexing where the literally encoded header is appended to the header table, thus having the next available index, and substitution indexing where the literally encoded header replaces a header previously present at a given index in the header indexing table. Note that in the case of substitution indexing, the substituted index is encoded to fully define a substitution indexing and make it possible for a decoder to perform the same substitution in a local corresponding header indexing table. Similarly, the literally encoded headers that are to index in the header table are flagged when transmitted to the decoder for the latter to be able to build the same header table as the encoder.

The above-defined literal representation of headers may optionally include the encoding of the header name by using the index associated with an entry already present in the header indexing table and having the same name.

Compression efficiency is obtained by the indexed representation of headers that occur for the second or more time. The indexed representation consists in encoding a header by encoding the index associated with the same header in the header indexing table.

Additional mechanisms further improve compression.

For example, according to HTTP/2.0 standard, a set of headers is encoded by taking the previous set of headers as a reference: only the differences with the previous set of headers are encoded. This is to take advantage of high redundancy between consecutive sets of HTTP headers (i.e. between the headers of consecutive HTTP messages).

To illustrate this mechanism, it is assumed that there are few differences between a set N of headers already encoded and a next set N+1 of headers to be encoded. Instead of encoding set N+1 by encoding all its headers, set N+1 is encoded by encoding the sole differences with set N.

To be noted that not all the headers of set N are used as a reference list for encoding set N+1: only the indexed headers of set N are present in the reference list for set N+1. This is because a header of set N that is not indexed is presumably unlikely to occur again in the next set N+1 of headers (otherwise, it would have been indexed).

The mechanism of header encoding with reference is further illustrated with reference to FIG. 1 that shows a first set 0 of headers (reference 100) which is encoded prior to a second header set 1 (reference 110). In this simple and illustrative example, the two header sets are made of three headers, a "url" header, a "method" header and a "cookie" header.

It is considered that the three headers of header set 0 have been literally encoded and then indexed in the header indexing table 120. Hence, after encoding of set 0, the header indexing table 120 comprises those three headers, with indexes ranging from 0 to 2.

Based on the above mechanism, the encoding of header set 1 takes header set 0 as a reference list of headers. The differences between header set 0 and set 1 are determined: the sole difference in the example is the value of the "url" header from set 0. Therefore, two information items have to be encoded, as shown in table 130:

the "url" header from set 0, which is present in the reference list for set 1, has to be removed. According to HTTP/2.0 standard, this may be done by encoding its index "IH(0)" (second line of table 130). There is no need to indicate whether this index corresponds to an addition or deletion of an entry in the header indexing table. This is because, since the header associated to this index is already present in the reference list (previously encoded header set), its presence in the list of differences only indicates a deletion according to the above-mentioned standard (a pair (name, value) cannot be present more than once in a set of headers); and the "url" header from set 1, which is not present in the reference list, has to be added. This is done by encoding the "url" header of set 1 (third line of table 130), for instance using a literal representation. The presence of this header necessarily corresponds to an addition, since said header is not present in the reference list.

Another mechanism is delta encoding which provides encoding of a header value using reference to a previously indexed header value (although the values are different) and encoding the difference between the two values. For instance a common prefix between the header value and the previously indexed header value is determined, and then a length of the common prefix is encoded followed by the characters that differ between the two values).

Taking the example of URLs, a header ("url", "http://example.com/456") could thus be encoded as a reference to a previous header ("url", "http://example.com/123") already present in the header indexing table. In this case, the following information is encoded:

the index of the previous header in the header indexing table;

a length of "19", corresponding to the common prefix between the values "http://example.com/456" and "http://example.com/123"; and the suffix to be added to said common prefix ("456").

This is to take advantage of high redundancy between consecutive sets of HTTP headers (i.e. between the headers of consecutive HTTP messages) to reduce the size of resulting encoded header data.

The header indexing mechanism explained above may also involve other representations (for instance, some values may be encoded as typed values, e.g. using binary encoding for integers and dates) and/or Huffman encoding or Deflate to improve the encoding of headers.

The header indexing scheme described above takes place during the HTTP request/response exchange between a server device and a client entity.

Due to the different nature of the requests and responses, the two directions of communication in the bidirectional connection do not usually convey headers having the same names. To take advantage of this difference with a view of optimizing compression, a HTTP node, either the server device or the client entity, manages two header indexing tables: the first one, referred to as a decoding header indexing table, for decoding headers from incoming messages, and the second one, referred to as an encoding header indexing table, for encoding headers of outgoing messages.

The header indexing tables are generated at their respective encoding sides. That means that there are a server-initiated indexing table and a client-initiated indexing table for each connection.

It is known from publication GB 2,496,385 a client entity and a server device that initialize respective initial compression dictionaries with information shared between them, for example headers they often use. This makes it possible to achieve good compression right from the first headers to be encoded and transmitted.

Regardless publication GB 2,496,385, each header indexing table is filled progressively with headers that are indexed, when encoding the headers at the encoding side and correspondingly decoding the headers at the decoding side. It results that the decoding indexing table at the client entity is at last similar to the server-initiated indexing table. Reversely, the decoding indexing table at the server device is at last similar to the client-initiated indexing table.

Since the server device responds to client entities' requests for data, the order of the responses is generally dependent on the order of the requests. This in turns has an effect on what is indexed in the server-initiated header indexing table and how it is indexed.

First, if comparing two server-initiated header indexing tables for two bidirectional connections established between the server device and two respective client entities, not all the headers from one server-initiated indexing table will be indexed in the other server-initiated indexing table.

For instance, in a case where a client entity only requests valid web resources, the server-initiated header indexing table will not contain any 'status: 404' header. However, if the other client entity requests a web resource that does not exist on the server device, the server-initiated header indexing table will probably contain a 'status: 404' header.

In addition, the order of the responses has also an impact on the indexes assigned to the entries in the server-initiated header indexing table, thus resulting in different server-initiated indexing tables for different connections. This is illustrated with reference to FIG. 2, wherein FIG. 2a represents headers in a HTTP request/response exchange A for the retrieval of a web page named "index.html", and FIG. 2b represents headers in a HTTP request/response exchange B for the retrieval of a CSS file named "style.css".

The server-initiated header indexing table 240 (shown in FIG. 2*c*) is generated by the server device on processing (encoding) response A 210 prior to response B 230. The server-initiated header indexing table 250 (shown in FIG. 2*d*) is generated by the server device on processing (encoding) response B prior to response A. In both cases, the 'content-type' and 'status' headers are indexed.

As can be seen from FIG. 2*c* and FIG. 2*d*, the server-initiated header indexing tables 240, 250 are different: the header entries are the same but the indexes associated with the two 'content-type' headers are not the same.

The above shows that HTTP/2.0 standard provides a dynamic header compression that is adapted to each client/server connection and adapts itself based on the HTTP headers that are encoded. One component contributing to this dynamic behavior is the server-initiated header indexing table specific to each client/server connection.

The server-initiated header indexing tables for the bidirectional connections with client entities and the processing based on these tables mandate processing and memory costs for client entities and server devices compliant with HTTP/2.0. In particular, these costs increase linearly with the number of client entities for the server device.

This may cause issues for server or proxy devices that have a large number of concurrent connections with client entities, in particular for small embedded devices such as CoAP (standing for Constrained Application Protocol) targeted devices.

SUMMARY OF THE INVENTION

The present invention has been devised to address one or more of the foregoing concerns, with a possible view of reducing processing and memory costs at the server device while keeping conventional client entities and devices.

In this context, according to a first aspect of the invention there is provided a method of exchanging information items (such as HTTP or metadata represented as JSON or XML) between a server device and a plurality of client entities, the server device establishing a plurality of connections with the plurality of client entities, wherein each connection involves a server-initiated indexing table for the server device to encode information items to be sent over the connection in the server-to-client direction, the method comprising the following steps performed at the server device:

obtaining a same single indexing table as the server-initiated indexing table of the connections with two or more client entities;

in response to receiving a request, generally the first one, for data from any of the two or more client entities:

pushing at least one entry of the single indexing table to the requesting client entity to configure the latter for decoding encoded information item exchanged in the server-to-client direction, encoding information items associated with the requested data using item indexing based on the single indexing table, and sending the requested data along with the encoded information items to the requesting client entity over the connection established with it, after having pushed the at least one entry to the requesting client entity.

The concept of pushing information, whatever the information items are, is known by the man skilled in the art, and therefore does not require detailed description. In short, the concept of pushing describes a style of Internet-based communication where the request for a given transmission is initiated by the sender or server device. It contrasts with the concept of pulling, where the request for the transmission of information is initiated by the receiver or client entity.

Some examples of commands for pushing entries of the indexing table to the client entities are given below.

Thanks to the invention, the server device sends or pushes in advance indexed headers that it is going to use for future item indexing, to the client entities. Since the server device has the control on these indexed headers, the server device is able to assign the same indexes for a group or all of the connections.

This results in handling a single server-initiated indexing table at the server device for a group or all of the client entities, instead of one server-initiated indexing table per connection. The memory used at the server device is thus decreased.

Furthermore, since the same indexes are used for various connections set up between the server device and client entities, the index assignment may be hardcoded in the server device, which may further improve the throughput of encoders. This thus tends to also reduce the processing costs.

In addition, by using the push technology, the invention may be used with conventional client entities, i.e. that do not embed components specific to the invention.

Correspondingly, according to a second aspect of the invention there is provided a server device configured to exchange information items with a plurality of client entities, the server device including a communication module to establish a plurality of connections with the plurality of client entities, wherein each connection involves a server-initiated indexing table for the server device to encode information items to be sent over the connection in the server-to-client direction, the server device further comprising:

a single indexing table used as the server-initiated indexing table of the connections with two or more client entities;

an indexing table push module configured, in response to receiving a request for data from any of the two or more client entities, to push at least one entry of the single indexing table to the requesting client entity to configure the latter for decoding encoded information item exchanged in the server-to-client direction;

a data encoder configured to encode information items associated with the requested data using item indexing based on the single indexing table, wherein the requested data are sent along with the encoded information items to the requesting client entity over the connection established with it, after the indexing table push module has pushed the at least one entry to the requesting client entity.

Optional features of the invention are further defined in the dependent appended claims. Where a feature is described in terms of process below, one skilled in the art will be able to implement it as a functional element in the server device of the invention.

According to an embodiment, all the entries of the single indexing table are pushed to the requesting client entity before sending one or more information items associated with the requested data. This is to initially fully configure the client entity. Pushing only some entries of the single indexing table may be profitable when updating a decoding indexing table at the client side. The need to update the decoding indexing table at the client side may result for example from an update of the single indexing table or from the switch of the client entity between two groups of clients to which the server device has assigned different encoding indexing table.

According to other embodiments, the same single indexing table is defined as the server-initiated indexing table of all the connections the server device has established with client entities. This configuration requires the low amount of memory at the server side to store the server-initiated indexing table.

According to an embodiment, the single indexing table is used to index HTTP headers in HTTP responses. This is a particular technical domain where the invention provides good performances.

In particular, a pushed entry of the single indexing table includes a template entry defined by a header name, an index and no specific header value. Concurrent connections often convey similar headers that have different values, for example headers identifying the communicating devices and/or the connection and/or the time, etc. The above provision makes it possible to offer compression of such headers with a single entry shared between the concurrent connections.

According to another embodiment, the single indexing table is computed from past statistics on information items already encoded by the server device over two or more connections established with client entities. This is to build the server-initiated indexing table with, for example, the most used (i.e. popular) headers. Indeed, in such configuration, compression ratio of the headers is optimized. For example, a list of items already encoded can be arranged in order according to an ordering criterion (for instance the number of occurrences of each header within a sliding time window) and the first headers in the order can be successively considered and selected to fill the single indexing table, until the indexing table reaches a predetermined memory size.

In embodiments of the invention, the entries to be pushed of the single indexing table are split into two or more ordered blocks that keep the order of the entries in the single indexing table, and the resulting blocks are pushed to the requesting client entity following the order. Each block may thus be sent as a set of information items (e.g. headers) to be indexed by the client entity. The above provision ensures the push of the considered entries to comply with rules of standards. For example, particular HTTP/2.0 implementations may require that a header block only comprise one "status" headers. Thanks to the splitting, two "status" headers are therefore distributed into two blocks.

In other embodiments of the invention, the pushed entries are pushed to the requesting client entity as new information items to index, in the same order as they are ordered in the single indexing table. In other words, the table is not sent as such, but each item therein to be pushed is pushed to the client with an indication that it must be added to the local indexing table (this is done by literal encoding plus indexing flag). To ensure that the same indexing table is obtained at the client side, the server device must keep the order of the items as defined in the single indexing table, because indexing is usually incremental.

In yet other embodiments of the invention, the pushed entries are pushed to the requesting client entity using one or more PUSH_PROMISE frames defined in the HTTP/2.0 standard that keep the order of the entries in the single indexing table. This innovative use of the PUSH_PROMISE frame of HTTP/2.0 facilitates the compliance of the invention with conventional (in the meaning of HTTP/2.0) client entities.

In a variant, the response sending the requested data along with the encoded information items includes a (first) HEADER frame defined in the HTTP/2.0 standard, and the (first) HEADER frame includes the pushed entries keeping their order in the single indexing table, followed by the encoded information items. In other words, the pushed entries/headers defining all or part of the single indexing table starts the HEADER frame and then the information items/headers forming the response to the client's request are appended to the end of the pushed entries/headers. This ensures the client entity to first build the single indexing table pushed by the server device, before processing the encoded information items which may depend on the indexing table. Advantageously, this should be done in the first HEADER frame forming the response to the first request from the client entity, to ensure the latter to start processing any encoded data from the server device with the appropriate indexing table.

This variant may be used when the PUSH_PROMISE frame is not available.

According to a particular feature, the HEADER frame further includes, prior to the encoded information items, a removal instruction for each pushed entry to instruct the requesting client entity to remove each corresponding information item from a current decoded information item set. This configuration is specific to the use of the HEADER frame. This is because the pushed entries lead the client entity to create corresponding entries in a local decoding header indexing table but also to build a decoded header set that includes the headers corresponding to the pushed entries. However these headers are not associated with requested data, and may have no meaning for the client entity. The above provision thus ensures the client entity to actually erase or reinitiate its current decoded header set before receiving the first headers associated with the requested data.

As an example based on HTTP/2.0, the removal instruction in the HEADER frame to remove an information item is the same information item encoded using the corresponding index in the single indexing table. According to HTTP/2.0, sending an indexed header that is already present in the current header set of the decoder leads to deleting this header from the set. The above provision thus empties efficiently the current header set of conventional HTTP/2.0-compliant client entities, with low complexity and low bit costs.

In embodiments, the method further comprises, at the server device, updating statistics on information items upon encoding such information items using item indexing based on the single indexing table. For example, the statistics may include a hit/miss ratio of the single indexing table when encoding the information items using item indexing, i.e. the number of times an index is found (hits) in the indexing table when encoding an information item out of the number of times such an index is not found (misses).

These provisions make it possible to monitor the relevancy of the single indexing table that is currently used.

In embodiments, the method further comprises, at the server device, updating the single indexing table based on updated past statistics on the connections with the two or more client entities. This is to adjust the single indexing table to the evolving context of exchanged data. This is because some items of information that are indexed may no longer be relevant as the time goes.

In a particular embodiment, the updating is triggered when updated past statistics representing a hit/miss ratio of the single indexing table when encoding the information items using item indexing or when an average compression ratio of last encoded information items becomes lower than a predetermined threshold. These two criteria (hit/miss ratio and average compression ratio) reflect how efficient the current server-initiated indexing table is. In this context, the above provision ensures an efficient single indexing table to be continuously used.

In another particular embodiment, a new entry of the updated single indexing table is assigned the same index as an entry of the old single indexing table that matches the new entry. In the HTTP context, such entries may be new headers to be indexed. The above configuration provides that the same header keeps its index in the old and updated server-initiated indexing tables. It results that there is no need to send specific instructions to the client entity to update these particular entries.

In yet another particular embodiment, a new entry having an entry name and an entry value in the updated single indexing table is assigned the same index as an entry of the old single indexing table that has the same entry name but a different entry value. This is also to limit the size of instructions to update these particular entries, because a substitution instruction without re-encoding the entry name is sufficient. Of course, preference is given to assign an index corresponding to an already existing entry that entirely matches the new entry, meaning that the provision based on different entry value is used when the previous provision based on matching entry cannot be met.

In yet another particular embodiment, all entries of the updated single indexing table are pushed only to any client entity establishing a new connection with the server device, the already existing connections with the server device relying on the old single indexing table. This provision is particularly suitable for short-time connection since it is unlikely that the pushed indexing table becomes outdated.

In a variant to this particular embodiment, entries of the updated single indexing table are pushed to the client entities of open connections using one or more PUSH_PROMISE frames defined in the HTTP/2.0 standard. This may be used for longer connections. The client entities will then update their local server-initiated decoding indexing table with the received entries. In particular, the entries of the updated single indexing table pushed to the client entities only include the differences between the previous and updated single indexing tables. This is to reduce the amount of data to transmit to the clients to update their decoding indexing tables.

According to a particular feature of this variant, the push of entries of the updated single indexing table to a client entity is triggered upon receiving a new request for data from the client entity. This is to be compliant with the HTTP/2.0 standard.

In embodiments, the method further comprises, at the server device, augmenting the single indexing table used as server-initiated indexing table for a connection with a client entity with additional entries specific to the connection, the additional entries corresponding to encoded information items associated with data requested on the connection. This provides specific per-connection entries in the indexing table, thus resulting in improved compression.

Such additional entries may form an additional (dynamic) server-initiated indexing table for the connection, in which case the pushed server-initiated indexing table can be seen as purely static. In such situation, the server device can handle the same pushed server-initiated indexing table for two or more or even all the connections and small specific (dynamic) server-initiated indexing table for some individual connections.

In a particular embodiment, the step of augmenting is triggered on detecting a low compression ratio and/or low connection quality of the connection compared to a respective threshold. This provision makes it possible to discriminate between efficient connections for which the pushed entries of the server-initiated indexing table are sufficient and bad connections for which providing additional indexed items may substantially increase its efficiency in terms of compression. On overall, it improves management of compression with a plurality of client entities, by the server device.

In a variant to augmenting the single indexing table, the method comprises using, for each connection in the server-to-client direction, the obtained single indexing table without indexing any new item selected from the encoded information items associated with the data requested on the connection. This provision is to limit the processing costs at the server device.

In embodiments, the connections are bi-directional connections involving, in addition to the server-initiated indexing table, a client-initiated indexing table per connection for the server device to decode encoded information items received over the respective connection in the reverse direction. As explained above, this client-initiated indexing table is similar to the client-initiated indexing table used as encoding table at the corresponding client entity.

Another aspect of the invention relates to a method of exchanging information items between a server device and a plurality of client entities, the server device generating a single server-initiated indexing table for the server device to encode information items to be sent over any connection with a client entity in the server-to-client direction, the method comprising the following steps performed at the server device:

indexing an information item to be sent to any client entity, in the single server-initiated indexing table;

sending the information item to the client entity, causing the client entity to also index the information item in a local indexing table and to further process the received information item locally; and pushing the information item to the other client entities of the plurality along with an indication that said pushed information item is only to be added by the other client entities to their respective local indexing tables used for index-based decoding, so that all the client entities have the same local indexing tables.

The above method and any corresponding server device provide the same advantages as described above. In particular, since all the client entities have the same local indexing tables, memory consumption at the server device is reduced. Note that the plurality of client entities may represent a subset of all the client entities that share a connection with the server device.

The optional features defined above may also apply to this method of exchanging information items: the way an initial server-initiated indexing table may be built; the way the information items are transmitted to the other client entities; the way the initial server-initiated indexing table may be updated; etc.

For example, the indication that said pushed information item is only to be added to the respective local indexing tables may result from the use of a PUSH_PROMISE frame since it gives instruction to the client entity to only add the information item to the local indexing table, or from the use of a HEADER frame including the above-defined removal instructions.

Another aspect of the invention relates to a non-transitory computer-readable medium storing a program which, when executed by a microprocessor or computer system in an apparatus, causes the apparatus to perform the steps as defined above.

Another aspect of the invention relates to a method of exchanging information items between a server device and a plurality of client entities substantially as herein described with reference to, and as shown in, FIG. 5; FIGS. 5 and 6; FIGS. 5, 6 and 7; FIGS. 5, 6, 7 and 10 of the accompanying drawings.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other particularities and advantages of the invention will also emerge from the following description, illustrated by the accompanying drawings, in which:

FIG. 1 illustrates a mechanism of header encoding with reference;

FIGS. 2a-2d illustrate indexing table generation according to the prior art;

FIGS. 4a-4d compare the exchanges for obtaining web resources having links, without server push feature (FIG. 4b), and with server push feature according to two variants (FIGS. 4c and 4d).

DETAILED DESCRIPTION OF EMBODIMENTS OF THE INVENTION

The present invention concerns the exchange of items of information associated with requested data, between a server device and a plurality of client entities, wherein the information items are encoded by the server device using an indexing table before they are transmitted to the requesting client entity over a corresponding connection.

In embodiments of the invention that are described below, the information items are a set of HTTP headers composing part of the response by the server device to the request from the client entity.

According to the invention, the same single indexing table is obtained and used as a server-initiated indexing table for the server device to encode information items to be sent over the connections with two or more client entities in the server-to-client direction. In one embodiment, the same single indexing table is used for all the client entities. In variant, only a group of client entities may be concerned by the single indexing table, in which case a second indexing table may be considered by the server device for a second group of client entities. One or more other groups may also be considered. For example a group of mobile client devices may oppose to a group of desktop client devices because they have not the same processing capacities and thus different indexing tables may be used (in particular regarding their memory size). Another example is web-browser based client entities vs. native application client entities. This is the server device which, when receiving information about a new client entity, determines which indexing table to be used as server-initiated indexing table.

Explanations below are based on a single indexing table for all the client entities.

To efficiently configure the client entities with the single indexing table for them to be able to decode indexed information items, the server device provides, in response to receiving a first request for data from any of the client entities, pushing at least one entry of the single indexing table to the requesting client entity. Preferably all the entries are pushed when the client entity has an empty local decoding table. In a variant where the client local decoding table is not empty, only the entries defining the differences with the single indexing table are pushed. This is to save transmission costs.

As a consequence of pushing the entries, the server device may encode any information item associated with data requested by any client entity, by using item indexing based on the single indexing table known by each requesting client entity, and then send the requested data along with the encoded information times to the requesting client entity over the connection established with it. Note that the pushed entry or entries may actually be used to index some of the information items to encode.

Figure 3:
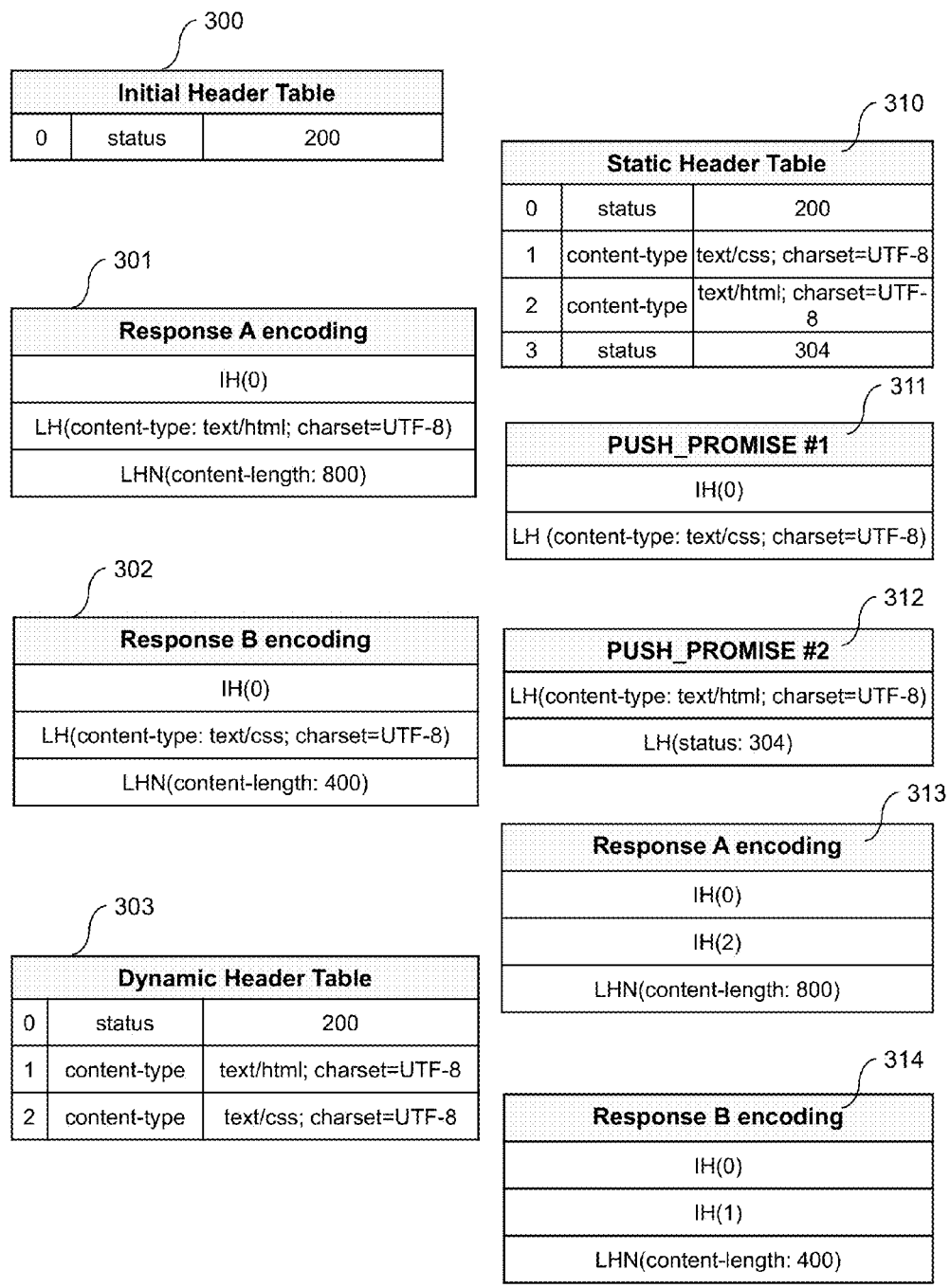
FIG. 3 provides an illustrative comparison of encoding a set of HTTP headers in a response to the client entity, with and without the invention.

FIG. 3 provides an illustrative comparison of encoding a set of HTTP headers in a response to the client entity, with and without the invention.

In this example, the connection between the server device and the client entity is expected to just start, where a first message to send is response A 210 made of three headers as shown in FIG. 2a, followed by response B 220 made also of three headers as shown in FIG. 2b.

With known mechanisms (i.e. without the invention), a by-default initial server-initiated header indexing table 300 is used for all the connections. In the example, it includes only one header ('status: 200').

The encoding 301 of response A using known techniques starts by encoding the status header as an indexed header (IH) with index 0 since it is already present in the initial indexing table 300. The next header "content-type: text/html" is encoded as a new indexed literal header (LH) and the header "content-length" is encoded as a not-indexed literal header (LHN).

After the encoding 301 of response A, the header indexing table thus includes, in addition to the status header, a new entry corresponding to the header "content-type: text/html". This is shown as the second line in the dynamic header indexing table 303 shown in the Figure. The encoded response A can then be sent to the requesting client entity.

Next, response B header set is encoded (302) starting with the status header encoded as an indexed header with index 0. It is followed by the "text/css" content-type header which is encoded as a new indexed literal header and the header "content-length" is encoded as a not-indexed literal header. The encoded response B can then be sent to the requesting client entity.

After the encodings of response A and response B, the header indexing table is as shown in the Figure (reference 303) where a new entry (line 3) stores the "text/css" content-type header. One may note that the two content-type headers are ordered according to their use in the responses.

In contrast, the same encodings based on the invention are illustrated in the right part of the Figure. The server device generates a static header indexing table 310 that it pushes to any client entity that establishes a connection with it.

The example of FIG. 3 bases the push of the static header indexing table on PUSH_PROMISE frames defined in HTTP/2.0 standard.

Server push is a feature introduced by the HTTP/2.0 standard. This feature allows server devices to send unsolicited web resource representations to client entities.

Web resources such as web pages are known to usually include links to other resources, which themselves may also include links to other resources.

To fully display such a web resource at a requesting client entity, all the linked and sub-linked therein need to be discovered and corresponding resources to be retrieved by the client entity. This incremental discovery may slow the rendering of the web resource, in particular on high latency networks such as mobile networks.

The server push feature is used to push these linked or sub-linked resources before the client entity performs the incremental discovery. Indeed, when receiving a request for a given web resource, the server device may easily discover the other resources needed for the entire rendering of the requested resource. By sending at the same time the requested resource and the discovered linked resources using the push feature, the server device thus allows reducing the load time of the web resource.

The server push feature works typically as follow:
the server device receives an initial request from a client entity and starts sending the content response;
at the same time, the server device sends PUSH_PROMISE messages (defined in HTTP/2.0) to the client entity. The PUSH_PROMISE messages identify the other resources the server device is planning to push. The goal of the PUSH_PROMISE messages is to let the client entity knowing in advance which resources will be pushed. In particular, this reduces the risk for a client entity to send a request for the same resource that is about to be pushed by the server device. To further reduce this risk, the server device sends a PUSH_PROMISE message before sending any portion of the response to the initial request that refers to the resource described in the PUSH_PROMISE messages. This also allows the client entity to cancel the promised resources if the client entity does not want those resources (the client may already store them in memory);
the server device starts sending all the promised resources listed in the sent PUSH_PROMISE message;
the server device finishes sending the response to the client's request and all promised resources;
the client entity receives the response to its request as well as the promised resources listed in the received PUSH_PROMISE message. The promised resources are generally stored in a client cache, and the response is used by a client application, for instance a browser that will display the retrieved web page;
on performing the display, when the client application needs one of the resources linked in the retrieved web page, the needed resource is immediately retrieved from the client cache because it has been pushed by the server device, without incurring any network delay.

FIG. 4 compares the exchanges for obtaining web resources having links, without the server push feature (FIG. 4b), and with the server push feature according to two variants (FIGS. 4c and 4d).

FIG. 4a shows an exemplary set of resources stored on the server device and their relationship as a graph. The set of resources $R_1$, $R_2$, $R_3$, and $R_4$ is intertwined meaning that these resources need to be downloaded together to be understood. In addition, sub-resources A to H linked to these intertwined resources are defined. The sub-resources are related to one, two or three resources. For instance, A is linked to $R_1$ and C is linked to $R_1$, $R_2$ and $R_4$.

FIG. 4b illustrates a typical HTTP exchange without using the server push feature. First, the client entity requests resource $R_1$. Upon receiving it from the server device, it discovers resource $R_2$ and sub-resources A, B, C and D. It then requests them to the server device. Upon receiving them, the client entity again discovers resources $R_3$, $R_4$, and sub-resources E, F and G. After obtaining it on requesting the server device, the client entity discovers sub-resources H and I that it requests to the server device.

This typical HTTP exchange without the server push feature requires four round-trips to retrieve the whole set of resources and sub-resources.

In contrast, FIG. 4c illustrates the retrieval of the same resources by the client entity, using the server push feature.

First, the client entity requests resource $R_1$. Upon receiving the request, the server device is able to discover directly-connected sub-resources linked to $R_1$, namely sub-resources A, B, C and D. In response to request $R_1$, the server device thus sends resource $R_1$ and pushes sub-resources A, B, C and D to the client entity. The latter discovers that resource $R_2$ is needed and then requests it to the server device. Upon receiving the request, the server device is able to discover directly-connected sub-resources linked to $R_2$, namely sub-resources F and G. In response to request $R_2$, the server device thus sends resource $R_2$ and pushes sub-resources F and G to the client entity. The latter discovers that resources $R_3$, $R_4$ are needed and then requests them to the server device, which in turns discovers sub-resources E, H and I. The server device then sends requested resources $R_3$, $R_4$ and pushes sub-resources E, H and I.

This server-push-feature-based process requires three round-trips to retrieve the whole set of resources.

FIG. 4d illustrates the retrieval of the same resources by the client entity, using a slightly more aggressive server push strategy than in FIG. 4c: the server device is able to push linked resources in addition to directly-connected sub-resources.

First, the client entity requests resource $R_1$. Upon receiving the request, the server device is able to discover directly-connected resource and sub-resources linked to $R_1$, namely resource $R_2$ and sub-resources A, B, C and D. In response to request $R_1$, the server device thus sends resource $R_1$ and pushes resource $R_2$ and sub-resources A, B, C and D to the client entity. The latter discovers that resources $R_3$, $R_4$, and sub-resources F, G are needed and then requests them to the server device. Upon receiving the request, the server device is able to discover directly-connected sub-resources linked to the requested resources $R_3$ and $R_4$, namely sub-resources E, H and I. In response to request $R_2$, the server device thus sends resources $R_3$ and $R_4$, and pushes sub-resources E, H and I to the client entity.

This more aggressive process requires two round-trips to retrieve the whole set of resources.

These examples of FIG. 4 show that the number of round-trips is decreasing from four without PUSH to two using an aggressive PUSH. It may be even decreased to one single round trip in the degenerated case where the server device pushes the whole set of linked resources at once. Attention should be pay to the level of aggressiveness of the push strategy because, as the strategy is more aggressive, the probability that the server device pushes data that is not useful or already cached in the client entity substantially grows.

They also show that the server device has the control on what is pushed, when and in which order.

Back to FIG. 3, two PUSH_PROMISE messages or frames 311/312 as defined in HTTP/2.0 are generated to contain each a header block splitting the generated static header table 310. One may note that the static header table 310 has been split into two header blocks in order to avoid having two "status" headers in the same header set, which may raise errors in specific implementations of the above-mentioned standard.

Each PUSH_PROMISE frame includes two headers: one "content-type" and one "status", both encoded as indexed literal header (IH). The four headers are sorted according to their entry order in the static header indexing table 310.

That means that the pushed entries of the static header indexing table 310 will be pushed to the requesting client entity as new information items/headers to index, in the same order as they are ordered in the single indexing table. In addition, the static indexing table, and more generally the pushed entries, are split into two or more ordered header blocks that keep the order of the entries in the single indexing table.

As soon as the server device receives an initial (or first) request for data from a client entity, the server device sends the two PUSH_PROMISE frames 311/312 one after the other to the requesting client entity for the latter to configure its local decoding indexing table. Indeed, the headers as transmitted in the PUSH_PROMISE frames make it possible for the client entity to progressively build its decoding indexing table until it reaches the same state as the static header table 310 generated by the server device.

Once the frames have been sent, the header indexing table is filled at the client entity side to make it possible for it to decode headers sent by the server device. On the other hand, the server device can now encode any header associated with the requested data using header indexing based on the pushed static header indexing table 310. Of course some headers will be encoded as indexed headers (IH) and others will be encoded as literal not-to-indexed headers (LHN), as can be seen from response A set (313) and response B header set (314).

Figure 5:
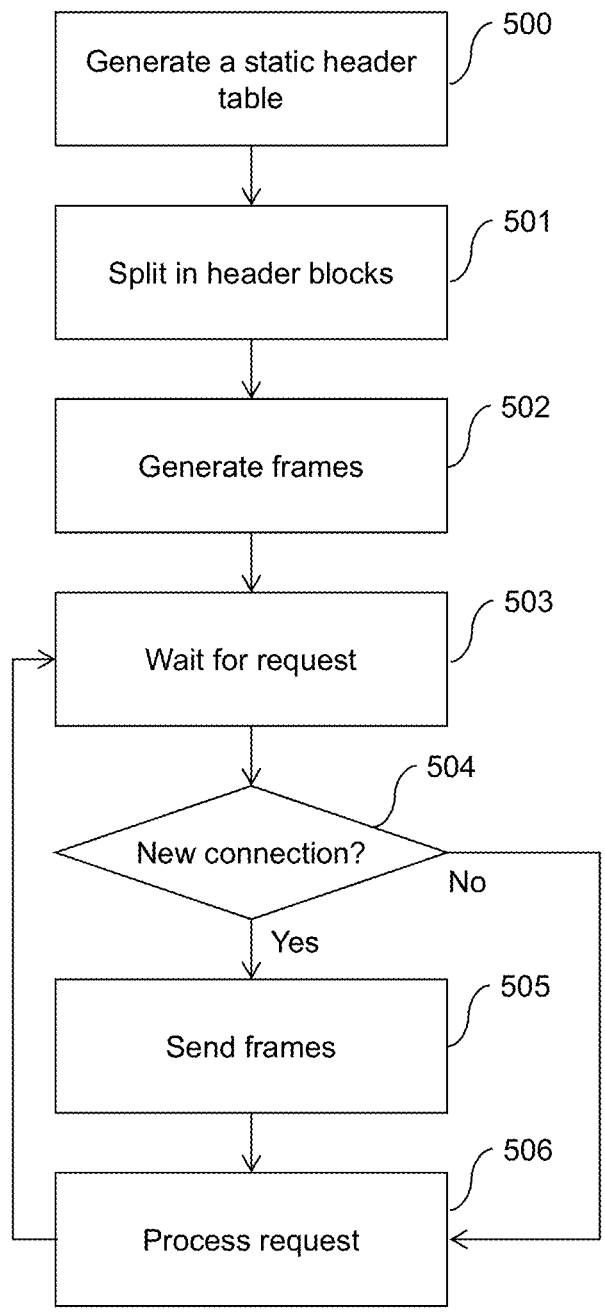
FIG. 5 is a flowchart illustrating general steps at the server device of a method of exchanging headers with a requesting client entity.

FIG. 5 is a flowchart illustrating general steps at the server device of a method of exchanging information items with a requesting client entity.

The server device starts at step 500 by generating the static header indexing table 310 that the server device intends to use as server-initiated indexing table for it to encode information items to be sent over the connection with the client entities (i.e. the encoding indexing table at the server side) in the server-to-client direction.

According to embodiments, the single header indexing table is computed from past statistics on information items/headers already encoded by the server device over two or more connections established with client entities, for example by detecting the most popular already-encoded headers.

Several algorithms may be contemplated.

Typically, the server device may log every header that it is sending during a given period of time. The log may be used to generate a list of headers, which list is ordered according to an ordering criterion.

One possible ordering criterion is the number of occurrences of each header. The header with the highest number of occurrences is placed at the top of the list. If the number of occurrences is the same for two headers, the smaller header is placed above the largest header (in terms of characters or symbols).

This makes it possible to build the single header indexing table from the N first headers in the list, N being computed to reach a maximum memory threshold, for instance 4096 bytes.

One other possible ordering criterion is the compression efficiency of the headers. The compression efficiency may be defined as the average number of bytes it may be saved by indexing the header. It depends on both the statistical number of occurrences of the header (on a sliding window for example) and the length of the header compared to the length of the substituting encoding index.

Yet another possible ordering criterion may be to minimize the size of the frames (defined below) used to convey the static header table.

For instance, where it is possible to encode a continuous group of headers with a single reference to a continuous group of header entries of the static header table 310, it may be beneficial to actually group those headers to take advantage of the single reference. Indeed, this needs few bits to encode compared to encoding each header individually.

In a similar manner, if the header table size is not a constraint, the same header entry may be assigned two or more indexes in the static header table to obtain bigger groups of headers that can benefit from the single reference.

Once the static header table 310 has been computed, it is optionally split into ordered header blocks at step 501. The static header table 310 can be seen as a big set of headers. And the idea here is to split this big set into two or more smaller sets of headers.

The splitting of the static header table is performed to ensure all HTTP/2.0 syntactic rules to be met and to ensure the header blocks, once decoded by any HTTP client entity, not to raise any error. As an example of syntactic rule, there are client entities that do not agree to process a header block with two 'status' headers therein. This is because if such client entity detects a two-status-header error, it immediately stops the connection with the server device and starts a new one. This would lead to wasting bandwidth and processing cycles.

Next to step 501, i.e. once the header blocks are available, one frame is generated per header block at step 502, this frame being configured to push the respective header block of the static header table to the client entity.

Examples of frames are PUSH_PROMISE frames as defined in HTTP/2.0 or HEADERS frames as defined in HTTP/2.0 or former version when PUSH_PROMISE frame feature is not available (for example the client entity may declare that it does not want to receive PUSH_PROMISE frames).

Note that these frames do not transmit the static header table or its entries as such, but transmit headers with a flag requesting the client entity to index them. So the client entity receiving them reconstructs a decoding table that, at last, has the same state as the initial static header table. This is why the order of the headers therein and the order of the frames should be respected.

Additional headers may be added to the frames to ensure validity of the frames. For instance, a PUSH_PROMISE frame should contain a 'status' header to meet HTTP/2.0 requirements.

The frames are ordered so that the headers therein keep their order defined in the single header indexing table 310. The order of the frames is thus the same as the order of the header blocks.

These steps 500 to 502 may be done on setting up the server device, for example at server launch time.

Once the server device is started, steps 503 to 506 described below are executed to process a request for data from a client entity and to push entries or all of the static header table 310 to that client entity.

At step 503, the server device waits for a new request from a client entity.

Upon receiving a request for data, the server device determines at step 504 whether this request comes from a new connection, i.e. if it is the very first request for data from the client entity.

If it is, the server device pushed the whole static header table 310 by directly sending the frames generated at step 502, to the requesting client entity. This is step 505.

As briefly introduced above, embodiments provide that the pushed entries of the single indexing table are pushed to the requesting client entity using one or more PUSH_PROMISE frames defined in the HTTP/2.0 standard that keep the order of the entries in the single indexing table.

In alternative embodiments, a HEADER frame defined in the HTTP/2.0 standard is used to send the response to the client entity's request, and the HEADER frame includes the pushed entries of the single indexing table keeping their order in the single indexing table, followed by encoded information items associated with the requested data. To provide the static header table 310 to the client entity as soon as possible, this is usually the first HEADER frame forming the response to the client entity's request that is used to include the entries of the static header table 310.

Each entry of the static header table 310 is serialized twice in the header block: first it is serialized as a header using the indexed literal representation (LH) as defined in HTTP/2.0. This is to instruct the client to build the same static header table. Upon decoding the indexed literal representation of the headers, the client adds these decoded headers to a local current header set and the client header indexing table is filled with all expected entries to match the server static header table.

Each entry is then serialized again, this time as a header using the indexed representation (IH), since the header matches an entry in the static header indexing table. This additional instruction is used to remove the header from the current client header set while leaving the header indexing table unchanged. The additional cost of this instruction is low, about one or two bytes per entry. Once the client has decoded the second serialized headers, the current client header set is empty while the client header indexing table perfectly matches the static header table generated at the server device. In other words, the HEADER frame includes, prior to the encoded headers associated with the requested data, a removal instruction for each pushed entry to instruct the requesting client entity to remove each corresponding header from the current client header set.

Finally, the headers of the response, i.e. associated with the requested data, are serialized at the end of the header block. The header block can then be sent to the client entity. Note also that this approach may also be used by a client entity wishing to send immediately to the server device its own static header table.

Due to the control of the server device on the sending of the frames, the server device is able to keep the frame order (and thus the header order) as computed at step 502.

Once the frames have been sent to the client entity, the server device can answer the client's request, with a new frame following the PUSH_PROMISE frame or with headers associated with the requested data, which headers are appended to the pushed headers in the HEADER frame. This is step 506. Next, the server device waits for a next request at step 503.

The push of the static header table 310 to the client entity makes it possible to configure the client entity with the same static header table at the beginning of processing its request.

During step 506 of processing the client's request, the server device retrieves the requested data and associated headers and encodes them using header indexing based on the static header table 310. This provides rather good compression level right from the first headers to encode.

Figure 10:
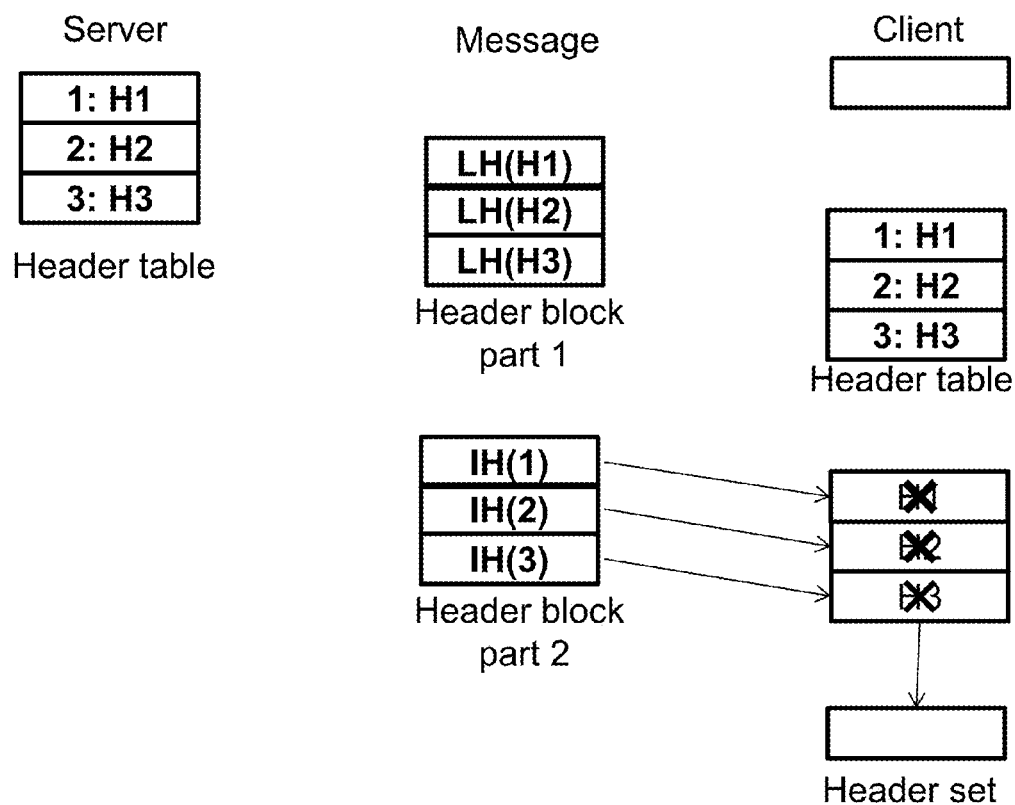
FIGS. 10a-10e schematically illustrate the mechanisms to share the static header table with a client entity according to embodiments of the invention using HEADER or PUSH-PROMISE frames according to HTTP/2.0.
Figure 10:
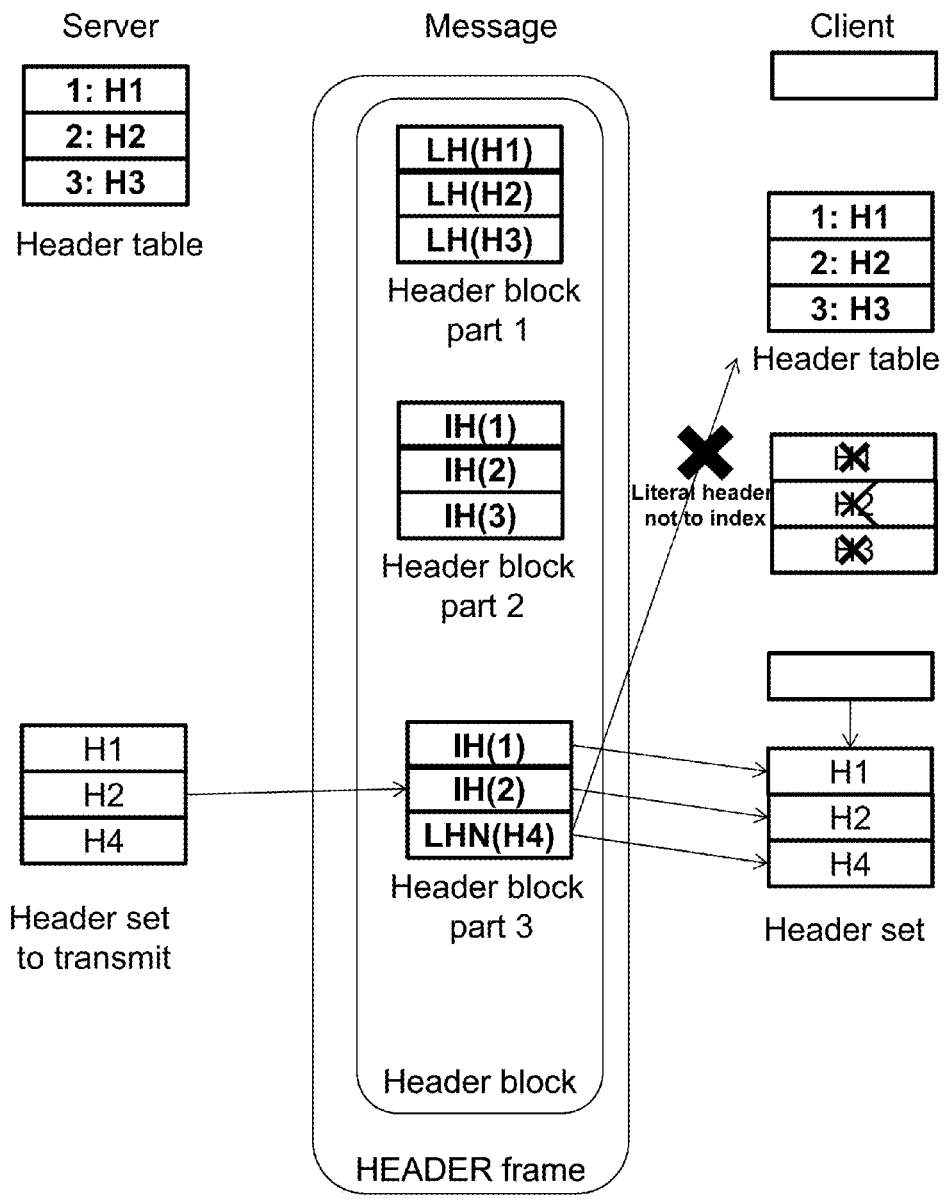
Figure 10:
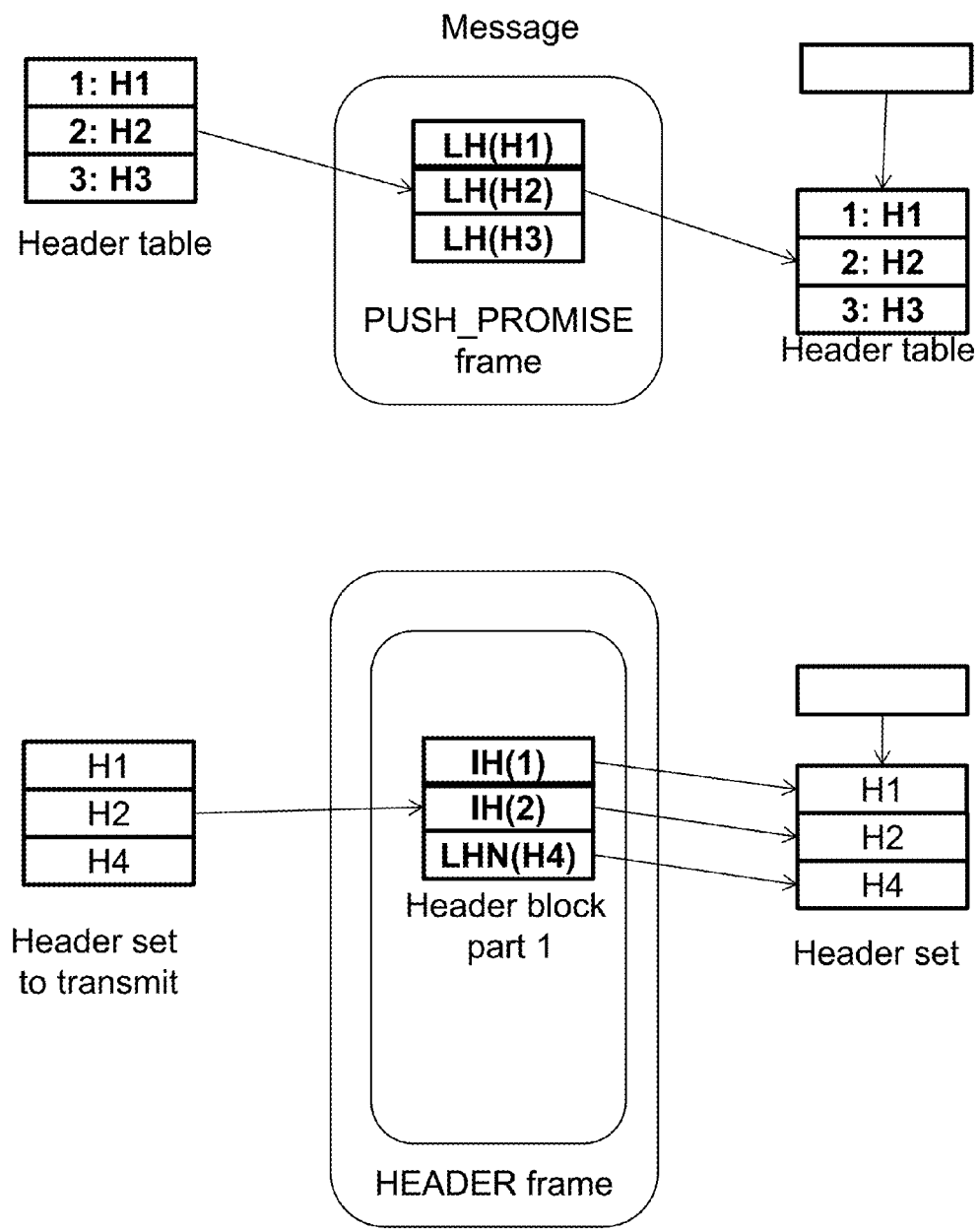

FIG. 10 schematically illustrates the mechanisms to share the static header table with a client entity according to embodiments of the invention using HEADER or PUSH-PROMISE frames according to HTTP/2.0.

FIG. 10a shows three ordered headers H1-H3 composing the static header table 310 at the server side.

FIG. 10b illustrates the situation when the client entity has decoded the first part of the header block that serializes the three headers in a HEADER frame. As explained above, the client entity builds its decoding header table similar to the static header table generated by the server device. In addition, the decoding leads to having a local current header set filled with the three headers.

Next, the second part of the header block that serialized the indexed same headers is received and processed by the client entity. It is recalled here that the second header block corresponds to removal instructions. As shown in FIG. 10c, each indexed header OHO), IH(2), IH(3)) leads to remove the corresponding headers from the local current header set. As a consequence, an empty local current header set is obtained.

This is the end of configuring the client entity with the static header table 310.

Next, the server device can encode headers required for the response to the client's request (FIG. 10d). In the example, there are three headers H1, H2 and H4 forming a third part of the header block. H1 and H2 are encoded using an index (IH(1), IH(2)) because they are present in the header indexing table. On the other hand, H4 is encoded as a not-indexed literal header (LNH(4)) to avoid adding a new entry in the static header indexing table which is shared by several client entities.

It results that the three headers H1, H2, H4 are added to the empty local current header set.

Finally, FIG. 10d visually shows the structure of the HEADER frame with a single header block made of a first part including the first serialized headers, a second part including the removal instructions which are indexed headers, and a final third part including the encoded headers that the client entity needs as part of the response to its request.

FIG. 10e illustrates the situation based on the PUSH_PROMISE frames. Since the headers in the PUSH_PROMISE frame do not feed the client current header set, only the first serialized headers H1, H2, H3 using literal encoding are included in the PUSH_PROMISE frame to configure the decoding header indexing table at the client side. Then a HEADER frame is used to convey the header H1, H2, H4 to transmit to the client entity.

Figure 6:
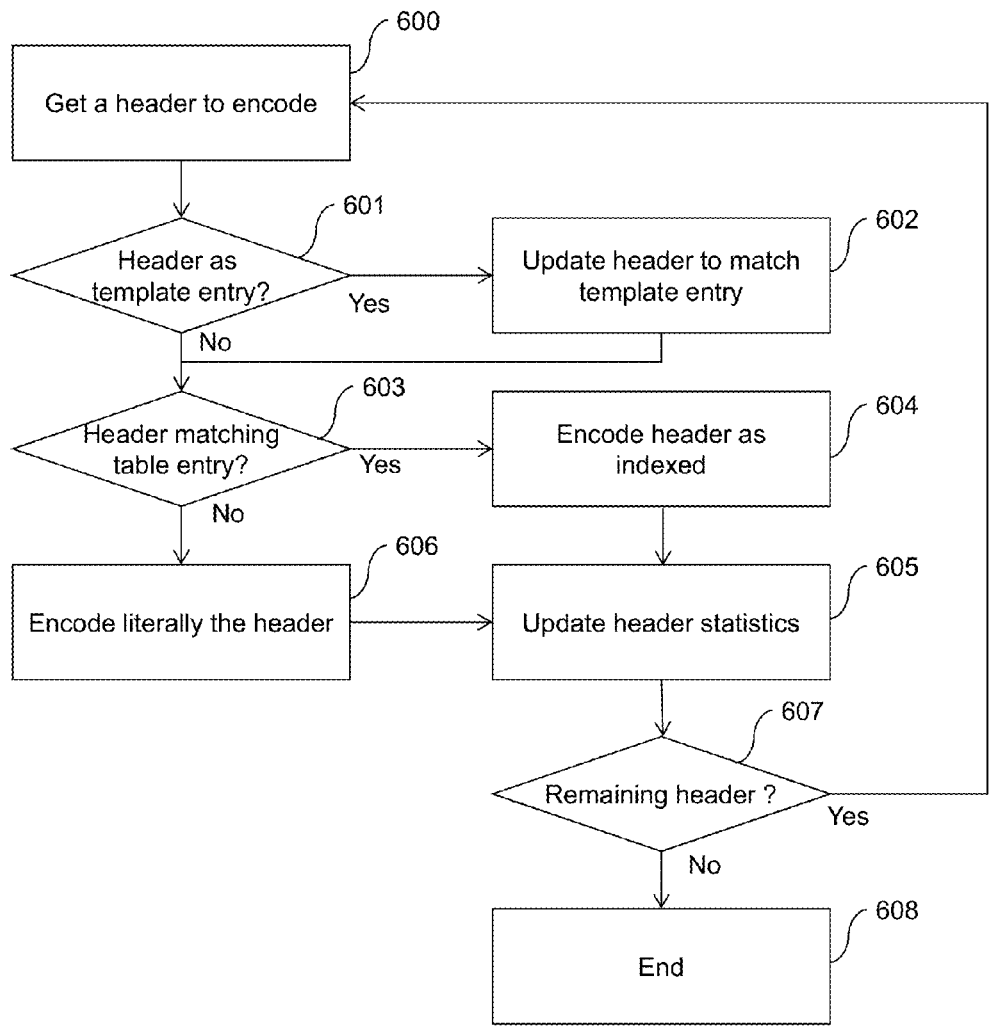
FIG. 6 is a flowchart illustrating steps at the server device of encoding a header set.

The encoding of a header set is now described with reference to FIG. 6.

The first step 600 consists in obtaining a header to encode, i.e. a header required for the response to the client request.

Next, at step 601, it is determined whether or not the current header can be defined by a template entry of the static header table 310. A template entry is defined by a header name, an index and no specific (or defined) header value.

Reasons to use template entries is that the header value of headers having the same header name may differ from one connection to another. Examples of such headers include the 'host' request header value that does not change during the whole connection. Similarly, the 'cookie' request header value generally does not change during the whole server session and if changing, the old value is no longer used. A list of template headers may be statically defined, a template entry thus being an entry in the static header table that matches one header name of the list of template headers.

In the context of the invention where the same static header table is used for the plurality of connections with client entities, it is thus highly beneficial to assign the same header index to headers having the same header name in all connections so that these headers can be optimized jointly with the invention.

If test 601 determines that the current header can be defined using a template entry, the header value of the current header is replaced to match the template entry, at step 602. This is because the template entry has a header value corresponding to the first occurrence of this header that has been indexed in the static header table.

Note that a specific complementary table may be used to store the header values that have been replaced, because these values need to be encoded and sent to the requesting client entities.

Next to step 602 or if test 601 is negative, a search is performed within the static header table 310 to find a table entry that matches the current header. This is step 603.

If the current header is already indexed, the current header is encoded as an indexed header with corresponding index retrieved from the table. This is step 604. Next to step 604, header statistics may be updated at step 605.

If the current header is not indexed, the current header is encoded as not-indexed literal header. This is step 606. Next to step 606, header statistics may be updated at step 605.

Using not-indexed literal representation makes it possible to avoid any dynamic evolution of the static indexing table at the server and client sides.

In such embodiments, the server device updates statistics on headers upon encoding them using header indexing based on the static header indexing table 310. For example, the statistics may include a hit/miss ratio of the static header indexing table when encoding the headers, i.e. the number of times an index is found (hits) in the indexing table when encoding the header out of the number of times such an index is not found (misses).

Storing the hits and misses may help to evaluate how relevant and efficient the static header table 310 is in the exchange of data with the client entities, with a view of updating the table if necessary as described below.

The statistics may combine results for all connections or may be dedicated to each connection independently.

Next to step 606, the process iterates at step 607 (loops back to step 600 for considering the next header) until the whole header set has been encoded. Then the process ends at step 608.

As introduced above, the server device may update the static header indexing table 310 based on updated past statistics on the plurality of connections, to adjust the static header table to the evolving context of exchanged data. Also, various ways may be envisaged to apply the updated static header table to existing connections and to new connections.

Figure 7:
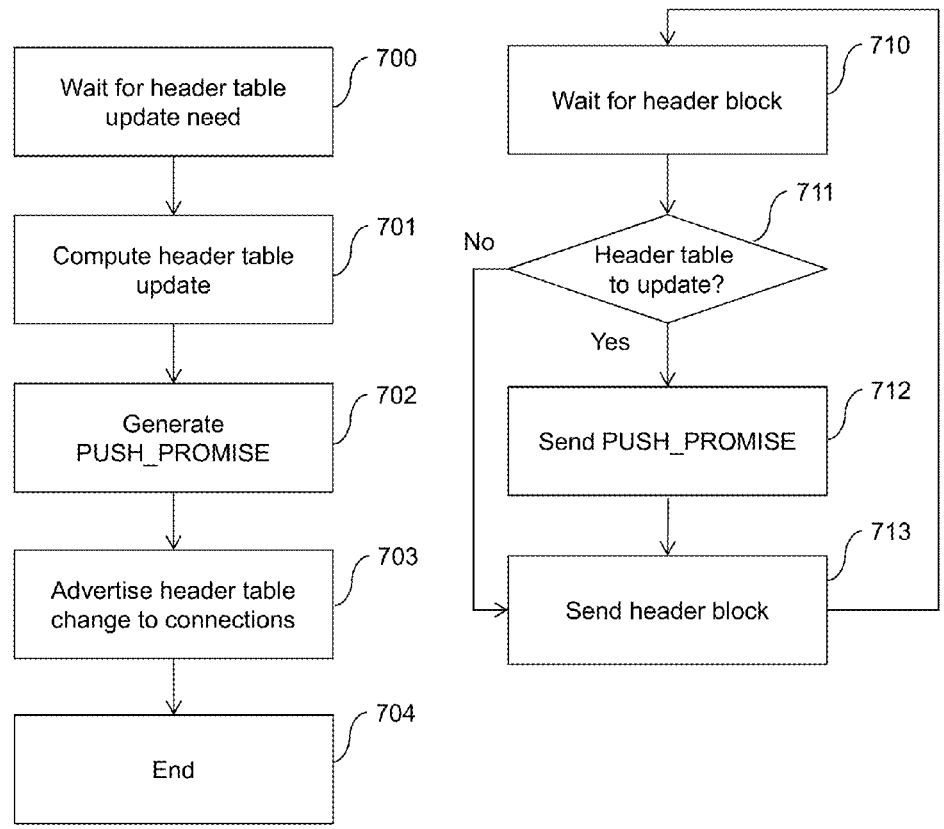
FIG. 7 is a flowchart illustrating steps of updating a static header table according to the invention and of transmitting it to client entities.

This is now described with reference to FIG. 7.

A first updating approach may consist in periodically checking on all the connections with the client entities whether updating the table would provide benefits or not.

Since the web server usage of headers may evolve over time, the static header table, which was computed at a given time, may progressively become less relevant for efficient header compression.

The process starts at step 700 by waiting for the need to update the static header table 310. Various triggering criterion may be contemplated, generally based on header indexing statistics, for instance as generated at step 605 above.

As an example, the updating is triggered when updated past statistics representing a hit/miss ratio of the static header indexing table becomes lower than a predetermined threshold. That means that the server device monitors the hits and misses of the static header table. Indeed, as no indexing of new header in the static header table happens, the hit/miss ratio may decrease.

A criterion may be based on the hit/miss ratio on a sufficiently large number of header sets so that the ratio does not suffer from large fluctuations.

If the hit/miss ratio decreases below a threshold, e.g. 75% of the initial hit/miss ratio, it may be time to update the static header indexing table 310.

In a variant of triggering criterion, an average compression ratio of last encoded data is computed and the update is triggered when the average compression ratio becomes lower than a predetermined threshold.

To achieve this variant, the compression ratio of each header set is first computed and then averaged over a number of header sets. If the overall compression ratio (overall considering all the header sets) remains stable, the header table may remain the same. However, if the compression ratio drops below a threshold, e.g. below 75% of the original compression ratio, it may be time to update the header table.

Once a need to update the header table is detected at step 700, a static header table update is computed at step 701.

A first approach is to perform again the whole static header set computation from the last statistics, as explained above at step 500.

To minimize the changes in the static header table 310 and therefore to minimize the size in bytes of the update (update messages to be sent to the client entities), embodiments provides that the new header entries are sorted according to the static header table before updating.

A first approach is the following: a new entry of the updated static header indexing table is assigned the same index as an entry of the old static header indexing table that matches the new entry. This allows coding no instruction for all those headers that already exist.

However, other new headers to encode remain. As much as possible, a new entry (among the remaining headers) having an entry name and an entry value in the updated single indexing table is assigned the same index as an entry of the old single indexing table that has the same entry name but a different entry value. This allows using substitution encoding without having to re-encode the header name.

Then, all remaining new headers are encoded using either a literal representation or a substitution representation to cope with removal of old entries.

The static header table update (and thus instructions to send to the client entities) then consists in entries substitution, entries removal and entries insertion. Only the differences between the previous and updated single indexing tables are pushed.

In embodiments, a PUSH_PROMISE frame is generated at step 702 from the updated static header table by using substitution representations and incremental indexing representations. Note that no instruction is provided for unchanged table entries.

Also, it may be noted that the option of generating header blocks from the updated static header table is also a valid option to transmit static header table update information.

Once the PUSH_PROMISE frame has been generated, the server device may inform each connection that a new and updated static header table is available. This is step 703.

For example, the server device may send the PUSH_PROMISE frames to all open connections so that each connection automatically switches to the new and updated static header table.

Note that if the server device cannot send a PUSH_PROMISE frame (e.g. because the connection with the client entity is temporarily closed), the server device needs to wait for the next request from the client entity to be able to send the frames.

Alternatively to the use of PUSH_PROMISE frames, each connection may switch to the new and updated static header table once a new HEADER frame containing headers is to be emitted. The new HEADER frame will include the static header table update information (i.e. the differences with the previous static header table). In such a case, each connection stores whether it has switched from the old static header table to the new and updated one.

Then the process stops at step 704 when each connection has switched to the new and updated static header table.

Steps 710 to 713 describe how the server device can apply a header table update on a given connection as a PUSH_PROMISE frame.

Note that on the client side, usual client implementations update the static header table transparently.

At step 710, the server device waits for a header block to be sent on a given connection. The sending of such a header block typically happens when the server device receives a request from the client entity corresponding to the connection.

Once a header block is ready to be sent, the server device checks at step 711 whether a header table update is to be applied for the connection.

If so, the server device first sends at step 712 the PUSH_PROMISE frame prepared at step 702 and then sends at step 713 the requested header block.

In a variant relying for example on the HEADER frame to respond the client's request, the requested header block may be appended to the header table update information that is first inserted in the HEADER frame.

In the case no header table update is to be sent, the header block is directly sent at step 713 using known techniques, for example using a HEADER frame.

In the embodiments described above, the updated static header table is applied in the existing connections.

Embodiments of the invention may however provide that all entries of the updated static header indexing table are pushed only to any client entity establishing a new connection with the server device, the already existing connections with the server device relying on the old static header indexing table.

The choice between the first embodiments and these new-connection-based embodiments may depend on the average duration of a connection. For example, in case of short-time connection, the last approach is probably the best choice as the headers will not change a lot. However, in case of longer connection, preference may be given to the first approach.

Although the above is based on a unique static header table (except updating) defined by the server device and pushed to the client entities, additional entries specific to a connection may be used, the additional entries corresponding to headers that are indexed when encoded. This makes it possible to augmenting the static header indexing table used as server-initiated indexing table for the connection with the client entity.

The decision to use such additional entries may be triggered on detecting a low compression ratio and/or low connection quality of the connection compared to a respective threshold. For example it may be more beneficial to optimize header compression for mobile connections than for broadband connections.

In that case, the connection-specific header entries (or dynamic entries) are assigned indexes at the end of the static header table.

Note that the server device may use a dynamic header table separate from the static header table to store the dynamic entries, for each connection that requires dynamic entries. The need to separate the two tables comes from the fact that the static header table is shared by all the connections engaged by the server device.

On the other hand, the client entity may group all the static and dynamic entries into a single indexing table.

The server device may then decide to optimize specific connections using small additional dynamic entries while leaving most of the connections as is.

The update of both the static and dynamic header tables may be done in similar ways as described above with reference to FIG. 7.

On the contrary, when no dynamic entries are allowed, for each connection in the server-to-client direction, the obtained static header indexing table is used without indexing any new header in the table.

In embodiments of the invention, when the server device encodes headers for one connection, it may decide whether to index the headers to the header indexing table using conventional decision criterion, for instance based on the header names. At the end of the encoding of the current header set, if the header indexing table has been updated, the server device sends the necessary information to all other connections to update their header indexing table. The necessary update information is transmitted using PUSH_PROMISE frames and only includes information defining the differences between the previous header indexing table and the new one.

This approach is advantageously used for a reasonably small set of clients. Indeed, since particular implementations of this approach may require to lock the access to the header indexing table when a HEADER frame is to be sent, this may be less practical when the server device handles a large number of active connections.

Figure 8:
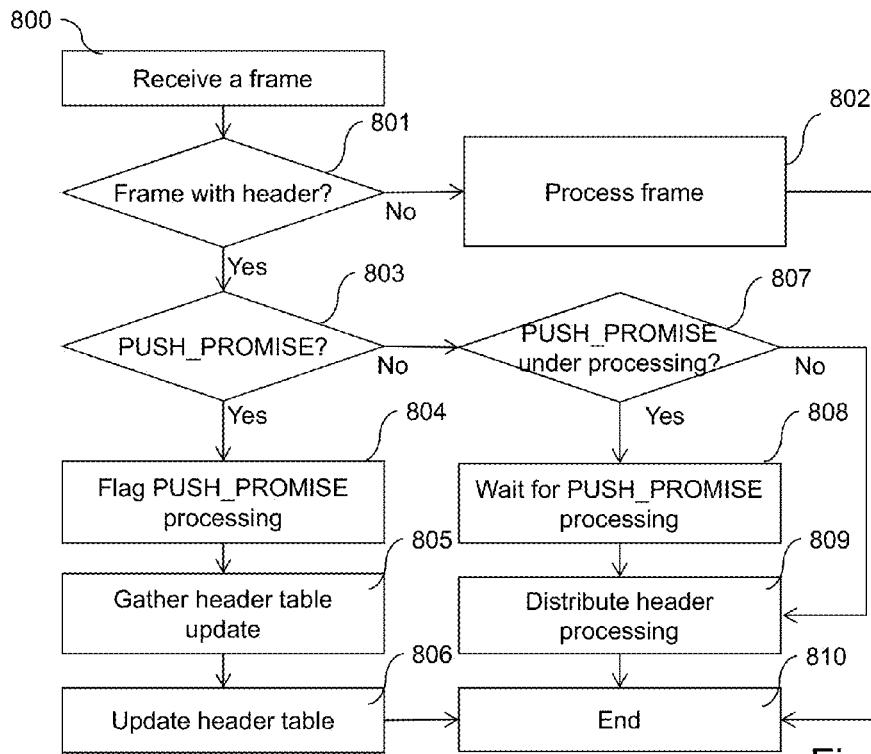
FIG. 8 is a flowchart illustrating steps of parallel decoding of headers at the client side.

For sake of completeness, the possibility of client-side or proxy-side parallel processing of incoming frames whenever the client entity knows that the static header table will not evolve except in the case of PUSH_PROMISE frames is now described with reference to FIG. 8.

Frames containing headers and received by the client entity are ordered.

Usually, HEADERS frames must be processed one after the other since the processing of one HEADER frame impacts the representation of the next frame header set.

In embodiments of the present invention where no dynamic entries are allowed and the diff encoding between two frames has been disabled, since the header indexing table is static, all HEADERS frames between two PUSH_PROMISE can be processed in parallel.

As soon as a PUSH_PROMISE frame is received, meaning that an update of the static header table happens, all HEADERS frames before the PUSH_PROMISE frame are processed to ensure that they are using the right static header table (before update). The PUSH_PROMISE frame is then processed alone with potential update of the static header table. Then the parallelization of the next HEADERS frames may resume.

To achieve that, the process starts at step 800 by receiving a frame to process.

The processor checks at step 801 whether the received frame includes a header set.

If not, the received frame can be processed at step 802 and the process is ends at step 810 for that frame.

Otherwise, if the received frame includes header information, two types of frames must be discriminated.

First it is determined at step 803 whether or not the received frame is a PUSH_PROMISE frame. If it is, the static header table must be updated using header table update information comprises in the frame.

To do that, the processor first uses a flag in memory to store at step 804 the fact that the static header table is being updated. This is to ensure new frames containing headers to be only processed after the static header table has been updated.

Next, the header table update information is gathered from the PUSH-PROMISE frame at step 805, and then the static header table is actually updated at step 806, at the end of which the flag of step 804 is emptied.

If the received frame is not a PUSH_PROMISE frame, the processor checks at step 807 whether a PUSH_PROMISE frame is under processing. This is done by checking the flag of step 804.

If a PUSH_PROMISE frame is under processing, the processor waits for the completion of the PUSH_PROMISE processing, i.e. of the update of the static header table. This is step 808.

In other words, the processing of any new frame is blocked until the static header table has been updated (i.e. the PUSH_PROMISE frame has been processed).

If no PUSH_PROMISE frame is under processing or if its processing has ended, the processor starts the header processing of the frame at step 809. This step may use existing parallel hardware to improve the performances of the frame processing. The process ends afterwards at step 810.

In a variant that allows processing the PUSH_PROMISE frame without waiting for the completion of all HEADERS frames, the static header frame may be duplicated for each parallel processing of headers. Note that blocking step 708 remains whenever a PUSH_PROMISE frame is received but not fully processed.

Figure 9:
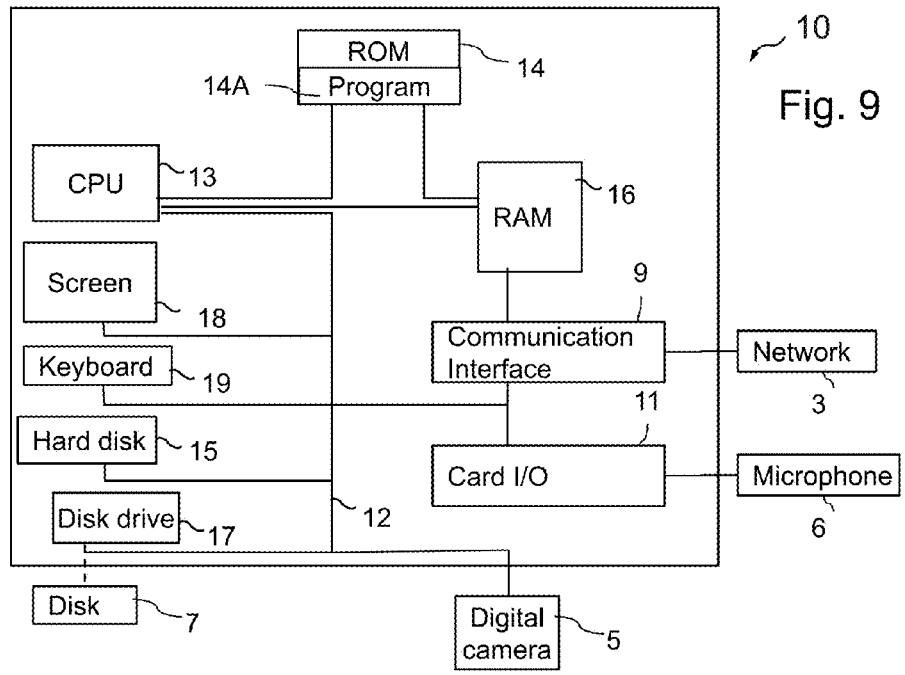
FIG. 9 illustrates an example of a device according to embodiments of the present invention.

FIG. 9 shows a device 10, in which one or more embodiments of the invention may be implemented, illustrated arranged in cooperation with a digital camera 5, a microphone 6 (shown via a card input/output 11), a telecommunications network 3 and a disc 7, comprising a communication bus 12 to which are connected:

- a central processing CPU 13, for example provided in the form of a microprocessor
- a read only memory (ROM) 14 comprising a program 14A whose execution enables the methods according to an embodiment of the invention. This memory 14 may be a flash memory or EEPROM;
- a random access memory (RAM) 16 which, after powering up of the device 10, contains the executable code of the program 14A necessary for the implementation of an embodiment of the invention;
- a screen 18 for displaying data such as HTTP messages and/or serving as a graphical interface with the user, who may thus interact with the programs according to an embodiment of the invention, using a keyboard 19 or any other means e.g. a mouse (not shown) or pointing device (not shown);
- a hard disc 15 or a storage memory, such as a memory of compact flash type, able to contain the programs of an embodiment of the invention as well as data used or produced on implementation of an embodiment of the invention;
- an optional disc drive 17, or another reader for a removable data carrier, adapted to receive a disc 7 and to read/write thereon data processed, or to be processed, in accordance with an embodiment of the invention and;
- a communication interface 9 connected to a telecommunications network 34
- connection to a digital camera 5

The communication bus 12 permits communication and interoperability between the different elements included in the device 10 or connected to it. The representation of the communication bus 12 given here is not limiting. In particular, the CPU 13 may communicate instructions to any element of the device 10 directly or by means of another element of the device 10.

The disc 7 can be replaced by any information carrier such as a compact disc (CD-ROM), either writable or rewritable, a ZIP disc or a memory card. Generally, an information storage means, which can be read by a micro-computer or microprocessor, which may optionally be integrated in the device 10, is adapted to store one or more programs whose execution permits the implementation of the method according to an embodiment of the invention.

The executable code enabling the coding device to implement an embodiment of the invention may be stored in ROM 14, on the hard disc 15 or on a removable digital medium such as a disc 7.

The CPU 13 controls and directs the execution of the instructions or portions of software code of the program or programs of an embodiment of the invention, the instructions or portions of software code being stored in one of the aforementioned storage means. On powering up of the device 10, the program or programs stored in non-volatile memory, e.g. hard disc 15 or ROM 14, are transferred into the RAM 16, which then contains the executable code of the program or programs of an embodiment of the invention, as well as registers for storing the variables and parameters necessary for implementation of an embodiment of the invention.

It should be noted that the device implementing an embodiment of the invention, or incorporating it, may be implemented in the form of a programmed apparatus. For example, such a device may then contain the code of the computer program or programs in a fixed form in an application specific integrated circuit (ASIC).

The device 10 described here and, particularly, the CPU 13, may implement all or part of the processing operations described above with reference to FIGS. 5 to 8.

The above examples are merely embodiments of the invention, which is not limited thereby.

The invention claimed is:

1. A method of exchanging information items between a server device and a plurality of client entities, the server device establishing a plurality of connections with the plurality of client entities, wherein each connection involves a server-initiated indexing table for the server device to encode information items to be sent over the connection in the server-to-client direction, the method comprising the following steps performed at the server device:
   obtaining a same single indexing table as the server-initiated indexing table of the connections with two or more client entities; and
   in response to receiving a request for data from any of the two or more client entities:
   pushing at least one entry of the single indexing table to the requesting client entity to configure the latter for decoding encoded information items exchanged in the server-to-client direction,
   encoding information items associated with the requested data using item indexing based on the single indexing table, and
   sending the requested data along with the encoded information items to the requesting client entity over the connection established with it, after having pushed the at least one entry to the requesting client entity.

2. The method of claim 1, wherein all the entries of the single indexing table are pushed to the requesting client entity before sending one or more information items associated with the requested data.

3. The method of claim 1, wherein the same single indexing table is defined as the server-initiated indexing table of all the connections the server device has established with client entities.

4. The method of claim 1, wherein the single indexing table is used to index HTTP headers in HTTP responses.

5. The method of claim 4, wherein a pushed entry of the single indexing table includes a template entry defined by a header name, an index and no specific header value.

6. The method of claim 1, wherein the entries to be pushed of the single indexing table are split into two or more ordered blocks that keep the order of the entries in the single indexing table, and the resulting blocks are pushed to the requesting client entity following the order.

7. The method of claim 1, wherein the pushed entries are pushed to the requesting client entity as new information items to index, in the same order as they are ordered in the single indexing table.

8. The method of claim 6, wherein the pushed entries of the single indexing table are pushed to the requesting client entity using one or more PUSH_PROMISE frames defined in the HTTP/2.0 standard that keep the order of the entries in the single indexing table.

9. The method of claim 1, wherein the response sending the requested data along with the encoded information items includes a HEADER frame defined in the HTTP/2.0 standard, and the HEADER frame includes the pushed entries keeping their order in the single indexing table, followed by a removal instruction for each pushed entry to instruct the requesting client entity to remove each corresponding information item from a current decoded information item set, further followed by the encoded information items.

10. The method of claim 9, wherein the removal instruction in the HEADER frame to remove an information item is the same information item encoded using the corresponding index in the single indexing table.

11. The method of claim 1, further comprising, at the server device, updating the single indexing table based on updated past statistics on the connections with the two or more client entities.

12. The method of claim 11, wherein the updating is triggered when updated past statistics representing a hit/miss ratio of the single indexing table when encoding the information items using item indexing or when an average compression ratio of last encoded information items becomes lower than a predetermined threshold.

13. The method of claim 11, wherein a new entry having an entry name and an entry value in the updated single indexing table is assigned the same index as an entry of the old single indexing table that matches the new entry or is assigned the same index as an entry of the old single indexing table that has the same entry name but a different entry value.

14. The method of claim 11, wherein all entries of the updated single indexing table are pushed only to any client entity establishing a new connection with the server device, the already existing connections with the server device relying on the old single indexing table.

15. The method of claim 11, wherein entries of the updated single indexing table are pushed to the client entities of all open connections using one or more PUSH_PROMISE frames defined in the HTTP/2.0 standard.

16. The method of claim 1, further comprising, at the server device, augmenting the single indexing table used as server-initiated indexing table for a connection with a client entity with additional entries specific to the connection, the additional entries corresponding to encoded information items associated with data requested on the connection.

17. The method of claim 1, further comprising using, for each connection in the server-to-client direction, the obtained single indexing table without indexing any new item selected from the encoded information items associated with the data requested on the connection.

18. A server device configured to exchange information items with a plurality of client entities, the server device including:

a communication module to establish a plurality of connections with the plurality of client entities, wherein each connection involves a server-initiated indexing table for the server device to encode information items to be sent over the connection in the server-to-client direction;

a memory for storing a single indexing table used as the server-initiated indexing table of the connections with two or more client entities;

a processor for executing an indexing table push instruction configured, in response to receiving a request for data from any of the two or more client entities, to push at least one entry of the single indexing table to the requesting client entity to configure the latter for decoding encoded information item exchanged in the server-to-client direction;

a data encoder configured to encode information items associated with the requested data using item indexing based on the single indexing table, wherein the requested data are sent along with the encoded information items to the requesting client entity over the connection established with it, after the indexing table push module has pushed the at least one entry to the requesting client entity.

19. A method of exchanging information items between a server device and a plurality of client entities, the server device generating a single server-initiated indexing table for the server device to encode information items to be sent over any connection with a client entity in the server-to-client direction, the method comprising the following steps performed at the server device:

indexing an information item to be sent to any client entity, in the single server-initiated indexing table;

sending the information item to the client entity, causing the client entity to also index the information item in a local indexing table and to further process the received information item locally; and pushing the information item to the other client entities of the plurality along with an indication that said pushed information item is only to be added by the other client entities to their respective local indexing tables used for index-based decoding, so that all the client entities have the same local indexing tables.

20. A non-transitory computer-readable medium storing a program which, when executed by a microprocessor or computer system in a device, causes the device to perform the steps of claim 1.

* * * * *